(12) United States Patent
Akaho

(10) Patent No.: US 8,159,089 B2
(45) Date of Patent: Apr. 17, 2012

(54) POWER SUPPLY CIRCUIT AND SEMICONDUCTOR DEVICE FOR USE THEREIN

(75) Inventor: Tadashi Akaho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 245 days.

(21) Appl. No.: 12/652,133

(22) Filed: Jan. 5, 2010

(65) Prior Publication Data
US 2010/0176784 A1    Jul. 15, 2010

(30) Foreign Application Priority Data
Jan. 8, 2009   (JP) .................................. 2009-002401

(51) Int. Cl.
    *H02J 1/00*   (2006.01)
(52) U.S. Cl. .......................................................... 307/82
(58) Field of Classification Search .................. 307/82
    See application file for complete search history.

(56) References Cited

U.S. PATENT DOCUMENTS
4,839,787 A * 6/1989 Kojima et al. .................. 363/60

FOREIGN PATENT DOCUMENTS
JP         2006-171367         6/2006

* cited by examiner

*Primary Examiner* — Robert L. Deberadinis
(74) *Attorney, Agent, or Firm* — Fish & Richardson P.C.

(57) ABSTRACT

A power supply circuit has: a DC/DC converter (M11, M12, L11, C11) which steps down an input voltage Vin to generate an output voltage Vout1 by rectifying and smoothing a pulsing switched voltage Vsw generated by turning on and off output switches (M11 and M12); and a charge pump (M11-M14, C12, C13) which steps up the input voltage Vin to generate an output voltage Vout2 by repeating charging and discharging of a charge accumulation capacitor (C12) by turning on and off charge transfer switches (M11-M14). First end of the charge accumulation capacitor is connected to a terminal from which the switched voltage Vsw is outputted. The output switches are also used as part of the charge transfer switches.

10 Claims, 4 Drawing Sheets

POWER SUPPLY CIRCUIT AND SEMICONDUCTOR DEVICE FOR USE THEREIN

CROSS-REFERENCE TO RELATED APPLICATIONS

This application is based on Japanese Patent Application No. 2009-2401 filed on Jan. 8, 2008, the contents of which are hereby incorporated by reference.

BACKGROUND OF THE INVENTION

1. Field of the Invention

The present invention relates to a power supply circuit that generates a desired output voltage from an input voltage, and a semiconductor device for use therein.

2. Description of Related Art

FIG. 4 is a circuit block diagram showing an example of a conventional power supply circuit. As shown in FIG. 4, the conventional power supply circuit has a power supply IC 100, an inductor L101, and capacitors C101 to C103. The power supply IC 100 has field-effect transistors M101 to M106, first and second drivers DRV101 and DRV102 integrated therein, and further has terminals T101 to T108 as means for establishing external electric connection.

Inside the power supply IC 100, the transistor M101 is connected between the terminals T101 and T102. The transistor M102 is connected between the terminals T103 and T104. Gates of the transistors M101 and M102 are each connected to the first driver DRV101. Outside the power supply IC 100, the terminal T101 is connected to a ground terminal. The terminal T102 is connected to a first end of the inductor L101. A second end of the inductor L101 is connected to a terminal from which an output voltage Vout1 is outputted, and is also connected to a first end of the capacitor C101. A second end of the capacitor C101 is connected to a ground terminal. The terminal T103 is connected to a terminal to which an input voltage Vin is inputted.

That is, in the conventional power supply circuit, a step-down DC/DC converter (a switching regulator) that generates a desired output voltage Vout1 from the input voltage Vin is formed by using the transistors M101 and M102, the first driver DRV101, the inductor L101, and the capacitor C101.

Also, inside the power supply IC 100, the transistor M103 is connected between the terminals T104 and T105. The transistor M104 is connected between the terminals T105 and T106. The transistor M105 is connected between the terminals T106 and T107. The transistor M106 is connected between the terminals T107 and T108. Gates of the transistors M103 to M106 are each connected to the second driver DRV102. Outside the power supply IC 100, the terminal T104 is connected to a ground terminal. The terminal T105 is connected to a first end of the capacitor C102. The terminal T106 is connected to the terminal to which the input voltage Vin is inputted. The terminal T107 is connected to a second end of the capacitor 102. The terminal T108 is connected to a terminal from which an output voltage Vout 2 is outputted, and is also connected to a first end of the capacitor C103. A second end of the capacitor C103 is connected to a ground terminal.

That is, in the conventional power supply circuit, a double step-up charge pump that generates a desired output voltage Vout2 (=2×Vin) from the input voltage Vin is formed by using the transistors M103 to M106, the second driver DRV102, and the capacitors C102 and C103.

An example of a conventional technology related to the above description is disclosed in JP-A-2006-171367.

SUMMARY OF THE INVENTION

However, the inventor of the present invention has found that the conventional power supply IC 100 described above suffer from the following inconveniences. That is, in the conventional power supply IC 100 described above, since the DC/DC converter and the charge pump are separately formed independent of each other, the transistors M101 and M102, the terminals T101 to T103, and the first driver DRV101 for the DC/DC converter and the transistors M103 to M106, the terminals T104 to T108, and the second driver DRV102 for the charge pump need to be separately prepared. This invites an increase in chip size and a cost increase.

In view of the above problem, an object of the present invention is to provide a power supply circuit having both a DC/DC converter and a charge pump without an unnecessary increase in number of transistors and external terminals.

To achieve the above object, according to one aspect of the present invention, a power supply circuit has: a DC/DC converter that steps down an input voltage or reverses a polarity of the input voltage to generate a first output voltage by rectifying and smoothing a pulsing switched voltage generated by turning on and off an output switch; and a charge pump that steps up the input voltage or reverses the polarity of the input voltage to generate a second output voltage by turning on and off a charge transfer switch to repeat charging and discharging of a charge accumulation capacitor. Here, a first end of the charge accumulation capacitor is connected to a terminal from which the switched voltage is outputted, and the output switch is also used as part of the charge transfer switch.

According to another aspect of the present invention, a power supply circuit has: a DC/DC converter that steps up an input voltage to generate a first output voltage by rectifying and smoothing a pulsing switched voltage generated by turning on and off an output switch; and a charge pump that reverses a polarity of the first output voltage to generate a second output voltage by turning on and off a charge transfer switch to repeat charging and discharging of a charge accumulation capacitor. Here, a first end of the charge accumulation capacitor is connected to a terminal from which the switched voltage is outputted, and the output switch is also used as part of the charge transfer switch.

According to the present invention, it is possible to provide a power supply circuit having both a DC/DC converter and a charge pump without an unnecessary increase in number of transistors and external terminals.

Other features, elements, steps, advantages and characteristics of the present invention will become more apparent from the following detailed description of preferred embodiments thereof with reference to the attached.

DETAILED DESCRIPTION OF PREFERRED EMBODIMENTS

Figure 1:
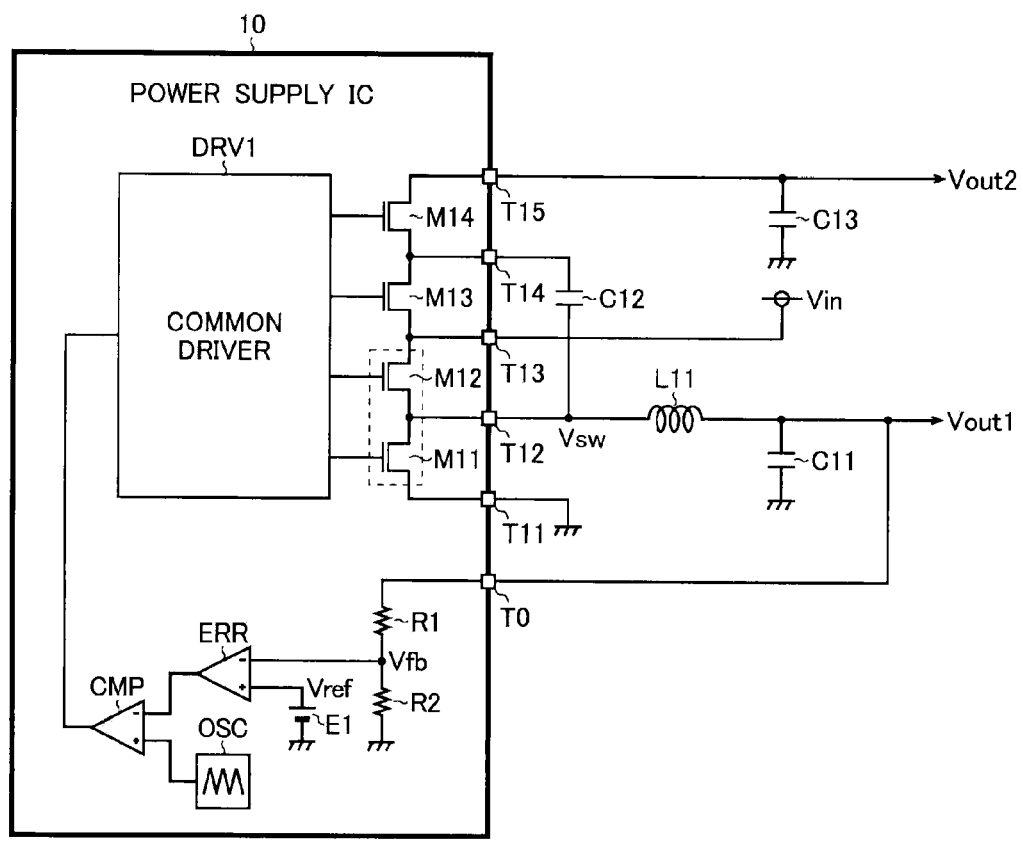
FIG. 1 is a circuit block diagram showing a first embodiment of a power supply circuit according to the present invention.

First, a description will be given of a first embodiment of a power supply circuit according to the present invention. FIG. 1 is a circuit block diagram showing the first embodiment of the power supply circuit according to the present invention. As shown in FIG. 1, the power supply circuit of this embodiment has a power supply IC 10, an inductor L11, and capacitors C11 to C13. The power supply IC 10 has integrated therein field-effect transistors M11 to M14, a common driver DRV1, resistors R1 and R2, a DC voltage supply E1, an error amplifier ERR, an oscillation circuit OSC, and a comparator CMP. The power supply IC 10 also has a terminal To, and terminals T11 to T15 as means for establishing external electric connection.

Inside the power supply IC 10, the transistor M11 is connected between the terminals T11 and T12. The transistor M12 is connected between the terminals T12 and T13. The transistor M13 is connected between the terminals T13 and T14. The transistor M14 is connected between the terminals T14 and T15. Gates of the transistors M11 to M14 are each connected to the common driver DRV1. The resistors R1 and R2 are connected in series between the terminal To and a ground terminal. An inversion input terminal (−) of the error amplifier ERR is connected to a connection node between the resistors R1 and R2. A non-inversion input terminal (+) of the error amplifier ERR is connected to a positive terminal of the DC voltage supply E1. A negative terminal of the DC voltage supply E1 is connected to a ground terminal. An inversion input terminal (−) of the comparator CMP is connected to an output terminal of the error amplifier ERR. A non-inversion input terminal (+) of the comparator CMP is connected to an output terminal of the oscillation circuit OSC. An output terminal of the comparator CMP is connected to the common driver DRV1.

Outside the power supply IC 10, the terminal T11 is connected to a ground terminal. The terminal T12 is connected to a first end of the inductor L11 and to a first end of the capacitor C12. A second end of the inductor L11 is connected to a terminal from which an output voltage Vout1 is outputted, and is also connected to a first end of the capacitor C11. A second end of the capacitor C11 is connected to a ground terminal. The terminal T13 is connected to a terminal to which an input voltage Vin is inputted. The terminal T14 is connected to a second end of the capacitor C12. The terminal T15 is connected to a terminal from which an output voltage Vout2 is outputted, and is also connected to a first end of the capacitor C13. A second end of the capacitor C13 is connected to a ground terminal. The terminal To is connected to the terminal from which the output voltage Vout1 is outputted.

That is, in the power supply circuit of the first embodiment, a step-down DC/DC converter (a switching regulator) is formed by using the transistors M11 and M12, the inductor L11, and the capacitor C11, and a double step-up charge pump is formed by using the transistors M11 to M14 and the capacitors C12 and C13. Also, in the power supply circuit of the first embodiment, a feedback control portion is formed by using the resistors R1 and R2, the error amplifier ERR, the DC voltage supply E1, the oscillation circuit OSC, the comparator CMP, and the common driver DRV1.

In the power supply circuit configured as described above, the step-down DC/DC converter steps down the input voltage Vin to generate the output voltage Vout1 by turning on and off output switches (the transistor M12 as an output device and the transistor M11 as a synchronous rectification device) to generate a pulsing switched voltage Vsw (having a rectangular waveform) at the terminal T12, and then rectifying and smoothing the switched voltage Vsw by using the inductor L11 and the capacitor C11.

The feedback control portion performs ON/OFF control of the output switches (M11 and M12) and the charge transfer switches (M12 to M14) such that a feedback voltage Vfb commensurate with the output voltage Vout1 is equal to a reference voltage Vref. The feedback control portion includes: a feedback voltage generation circuit (the resistors R1 and R2) that divides the output voltage Vout1 to generate the feedback voltage Vfb; a reference voltage generation circuit (the DC voltage supply E1) that generates the reference voltage Vref; an error amplifier ERR that amplifies a difference between the feedback voltage Vfb and the reference voltage Vref to generate an error voltage Verr; an oscillation circuit OSC that generates a slope voltage Vslope having a triangular waveform or a sawtooth waveform; a comparator CMP that compares the error voltage Verr with the slope voltage Vslope to generate a PWM signal; and a common driver DRV1 that generates drive signals for the output switches (M11 and M12) and the charge transfer switches (M11 to M14) based on the PWM signal.

In the feedback control portion configured as described above, the error amplifier ERR amplifies a difference between the feedback voltage Vfb extracted from the connection node between the resistors R1 and R2 and the reference voltage Vref generated by the DC voltage supply E1, and thereby generates the error voltage Verr. That is, the lower the output voltage Vout1 is than its target value, the higher the level of the error voltage Verr is.

The comparator CMP compares the error voltage Verr and the slope voltage Vslope to generate the PWM signal. At this time, as the output voltage Vout1 is lower than its target value, the error voltage Verr is higher and the high level period of the PWM signal is accordingly longer; and as the output voltage Vout reaches its target value, the error voltage Verr becomes lower and the high level period of the PWM signal becomes accordingly shorter.

The common driver DRV1 performs ON/OFF control of the transistors M11 and M12 such that the transistor M12 is ON and the transistor M11 is OFF when the PWM signal is high level, and in contrast, when the PWM signal is low level, the transistor M12 is OFF and the transistor M11 is ON. Thus, ON-duty (the ratio of an ON-period of the transistor M12 in a unit period) of the transistor M12 varies depending on how much higher one of the error voltage Verr and the slope voltage Vslope is than the other. Specifically, as the output voltage Vout1 is lower than its target value, the high level period of the PWM signal is longer and the ON-duty of the transistor M12 is accordingly larger; and as the output voltage Vout1 reaches its target value, the high level period of the PWM signal becomes shorter and the ON-duty of the transistor M12 becomes accordingly smaller.

As described above, in the power supply circuit of this embodiment, the output feedback control performed by using the feedback control portion makes the output voltage Vout1 of the DC/DC converter reach its target value.

On the other hand, in the power supply circuit configured as described above, the double step-up charge pump steps up the input voltage Vin to double its value to generate an output voltage Vout2 (=2×Vin) by turning on/off the charge transfer switches (transistors M11 to M14) to repeat charging and discharging of the charge accumulation capacitor C12.

A detailed description will be given of a specific operation of the charge pump. The common driver DRV1 turns on the transistor M11 and turns off the transistor M12 to make the switched voltage Vsw low level, and in synchronism with this, the common driver DRV1 turns on the transistor M13 and turns off the transistor M14. At this time, a low level electric potential (the ground voltage GND) of the switched voltage Vsw is applied to the first end (on the terminal T12 side) of the capacitor C12, and the input voltage Vin is applied to the second end (on the terminal T14 side) of the capacitor C12. As a result, the capacitor C12 is charged to the input voltage Vin.

The common driver DRV1 turns off the transistor M11 and turns on the transistor M12 to make the switch voltage Vsw high level, and in synchronism with this, the common driver DRV1 turns off the transistor M13 and turns on the transistor M14. At this time, a voltage applied to the first end (on the terminal T12 side) of the capacitor C12 is raised from the low level potential (the ground voltage GND) to a high level potential (the input voltage Vin) of the switched voltage Vsw. Here, since an electric potential difference equal to the input voltage Vin is given across the capacitor C12 by the above-mentioned charging, along with the voltage applied to the first end (on the terminal T12 side) of the capacitor C12 being raised to the input voltage Vin, a voltage extracted from the second end side (the terminal T14 side) of the capacitor C12 is also raised to 2×Vin (=(the voltage Vin at the first end of C12)+(the voltage Vin across the capacitor C12)).

Furthermore, at this time, since the transistor M13 is turned off and the transistor M14 is turned on, the voltage (2×Vin) extracted from the second end (on the terminal T14 side) of the capacitor C12 is applied to the first end of the capacitor C13. Moreover, the ground voltage GND is applied to the second end of the capacitor C13. As a result, the capacitor C13 is charged to (2×Vin), and the voltage (2×Vin) across the capacitor C13 is outputted as the output voltage Vout2. That is, the double step-up charge pump steps up the input voltage Vin to double its value to generate the output voltage Vout2 (=2×Vin).

Figure 4:
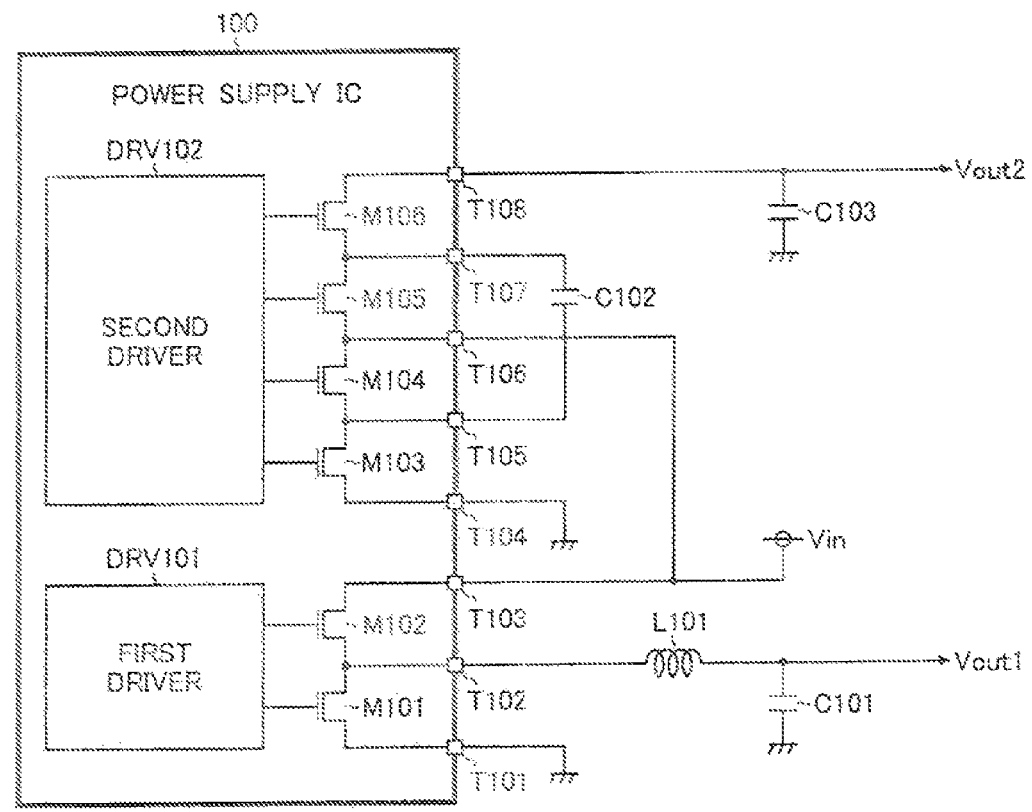
FIG. 4 is a circuit block diagram showing a conventional example of a power supply circuit.

As described above, in the power supply circuit of this embodiment, the first end of the charge accumulation capacitor C12 with which the charge pump is formed is connected to a terminal (the terminal T12) from which the switched voltage Vsw is outputted, and the output switches (the transistors M11 and M12) with which the DC/DC converter is formed are also used as part of the charge transfer switches with which the charge pump is formed (see a broken line in FIG. 1). ON/OFF control of the other charge transfer switches with which the charge pump is formed is performed according to duty ratios of the output switches with which the DC/DC converter is formed. With this configuration, the number of transistors is reduced by two, the number of terminals is reduced by at least one, and the number of drivers is reduced by one in comparison with the conventional configuration shown in FIG. 4. This makes it possible to realize a smaller chip size and a lower cost.

Transistors used as output switches of a DC/DC converter are typically designed to have a smaller ON-resistance than transistors used as charge transfer switches of a charge pump, and thus, with the power supply circuit of this embodiment, it is possible to increase the current capability of the charge pump without unnecessarily increasing the chip area.

The power supply circuit of this embodiment also provides a secondary advantage that noise on the DC/DC converter side is reduced as a result of the synchronous control of the DC/DC converter and the charge pump.

With the power supply circuit of this embodiment, where charging and discharging operations (charge accumulation and charge transfer operations between the capacitors C12 and C13) of the charge pump is controlled by using the switched voltage Vsw generated by the DC/DC converter, there is no need of separately providing a clock signal for controlling the charging and discharging operations. This helps avoid an unnecessary increase of the circuit scale.

The power supply circuit of this embodiment is preferable as power supply means for, for example, a camera module or a mobile device using a CMOS sensor.

Figure 2:
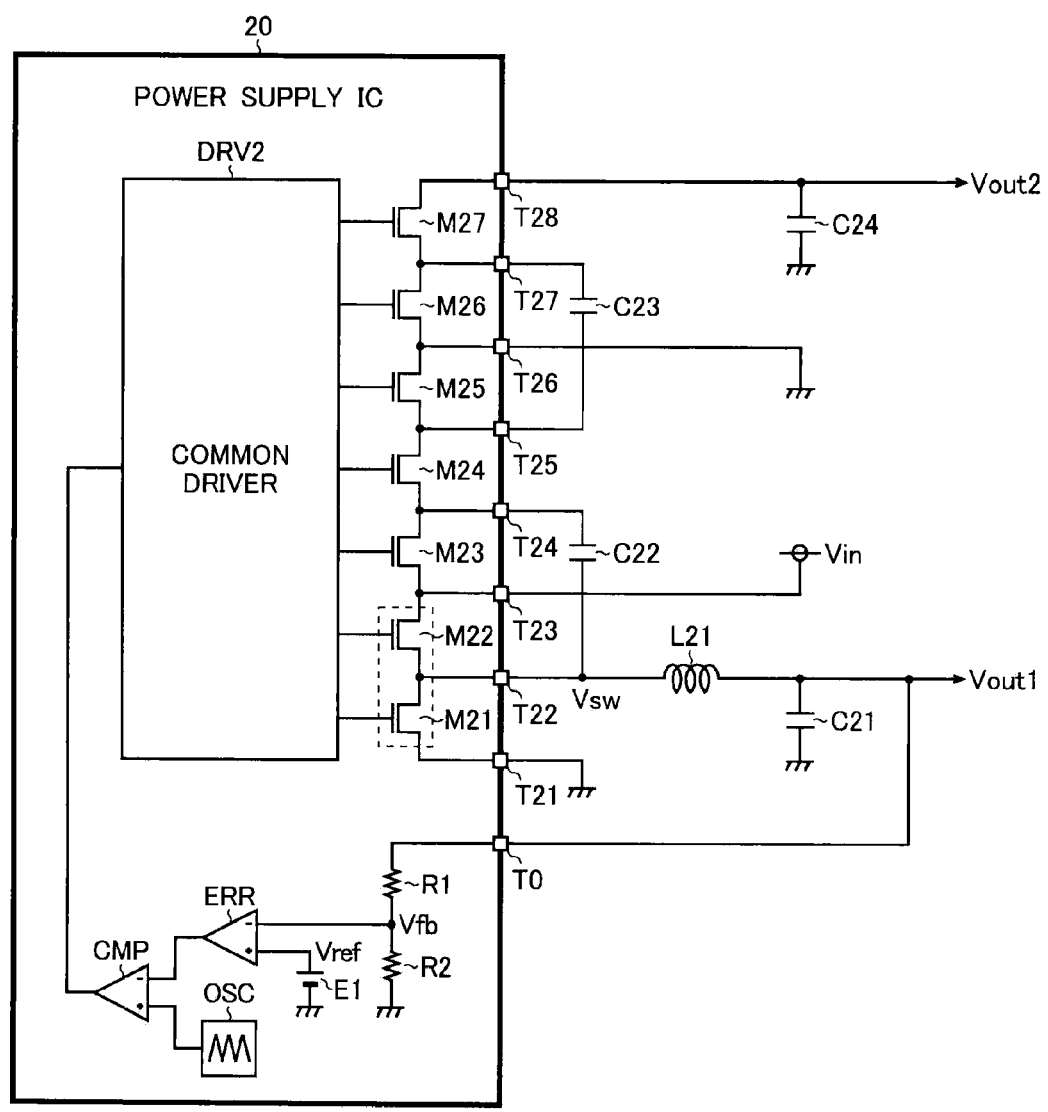
FIG. 2 is a circuit block diagram showing a second embodiment of a power supply circuit according to the present invention.

Next, a description will be given of a second embodiment of the power supply circuit according to the present invention. FIG. 2 is a circuit block diagram showing the second embodiment of the power supply circuit according to the present invention. As shown in FIG. 2, the power supply circuit of this embodiment has a power supply IC 20, an inductor L21, and capacitors C21 to C24. The power supply IC 20 has field-effect transistors M21 to M27, a common driver DRV2, resistors R1 and R2, a DC voltage supply E1, an error amplifier ERR, an oscillation circuit OSC, and a comparator CMP integrated therein, and further has a terminal To and terminals T21 to T28 as means for establishing external electric connection.

Inside the power supply IC 20, the transistor M 21 is connected between the terminals T21 and T22. The transistor M22 is connected between the terminals T22 and T23. The transistor M23 is connected between the terminals T23 and T24. The transistor M24 is connected between the terminals T24 and T25. The transistor M25 is connected between the terminals T25 and T26. The transistor M26 is connected between the terminals T26 and T27. The transistor M27 is connected between the terminals T27 and T28. Gates of the transistors M21 to M27 are each connected to the common driver DRV2. The connection relationship among the resistors R1 and R2, the error amplifier ERR, the DC voltage supply E1, the oscillation circuit OSC, the comparator CMP, and the common driver DRV2 is similar to that of the first embodiment described above, and thus no overlapping description thereof will be repeated.

Outside the power supply IC 20, the terminal T21 is connected to a ground terminal. The terminal T22 is connected to a first end of the inductor L21 and to a first end of the capacitor C22. A second end of the inductor L21 is connected to a terminal from which an output voltage Vout1 is outputted, and is also connected to a first end of the capacitor C21. A second end of the capacitor C21 is connected to a ground terminal. The terminal T23 is connected to a terminal to which an input voltage Vin is inputted. The terminal T24 is connected to a second end of the capacitor C22. The terminal T25 is connected to a first end of the capacitor C23. The terminal T26 is connected to a ground terminal. The terminal T27 is connected to a second end of the capacitor C23. The terminal T28 is connected to a terminal from which an output voltage Vout2 is outputted, and is also connected to a first end of the capacitor C24. A second end of the capacitor C24 is connected to a ground terminal. The terminal To is connected to the terminal from which the output voltage Vout1 is outputted.

That is, in the power supply circuit of the second embodiment, a step-down DC/DC converter (a switching regulator) is formed by using the transistors M21 and M22, the inductor L21, and the capacitor C21, and a polarity-reversing double step-up charge pump is formed by using the transistors M21 to M27 and the capacitors C22 to C24. Also, in the power supply circuit of the second embodiment, as in the first embodiment described above, a feedback control portion is formed by using the resistors R1 and R2, the error amplifier ERR, the DC voltage supply E1, the oscillation circuit OSC, the comparator CMP, and the common driver DRV2.

In the power supply circuit configured as described above, the operations of the step-down DC/DC converter and the feedback control portion are similar to those of the first embodiment, and thus no overlapping description thereof will be repeated.

The polarity-reversing double step-up charge pump steps up the input voltage Vin to double its value and reverses the polarity of the input voltage Vin to generate the output voltage Vout2 (=−2×Vin) by turning on/off the charge transfer switches (transistors M21 to M27) to repeat charging and discharging of the charge accumulation capacitors C22 and C23.

A specific operation of the charge pump will be described in detail. With respect to the ON/OFF control (the double step-up operation) of the transistors M21 to M24, which is similar to that of the transistors M11 to M14 of the first embodiment described above, no overlapping description thereof will be repeated, and merely the ON/OFF control (a polarity reversing operation) of the transistors M24 to M27 will be described below.

The common driver DRV2 turns on the transistors M24 and M26 and turns off the transistors M25 and M27 in reversing the polarity of the double stepped-up voltage (2×Vin) generated by the ON/OFF control of the transistors M21 to M24. At this time, the double stepped-up voltage (2×Vin) is applied to the first end (on the terminal T25 side) of the capacitor C23, and to the second end (on the side of the terminal T27) of the capacitor C23, a ground voltage GND is applied. As a result, the capacitor C23 is charged to the double stepped-up voltage (2×Vin).

After the charging of the capacitor C23 is completed, the common driver DRV1 turns off the transistors M24 and M26, and turns on the transistors M25 and M27. At this time, the voltage applied to the first end (on the terminal T25 side) of the capacitor C23 is reduced from the double stepped-up voltage (2×Vin) to the ground voltage GND. Here, across the capacitor C23, an electric potential difference equal to the double stepped-up voltage (2×Vin) is given as a result of the charging described above, and thus, along with the reduction of the voltage applied to the first end (on the terminal T25 side) of the capacitor C23 to the ground voltage GND, the voltage extracted from the second end side (the terminal T27 side) of the capacitor 23 is also reduced to (−2×Vin) (=(the voltage GND at the first end of the capacitor C23)−(the voltage 2×Vin across the capacitor C23)).

At this time, since the transistor M26 is turned off and the transistor M27 is turned on, the voltage (−2×Vin) extracted from the second end (on the terminal T27 side) of the capacitor C23 is applied to the first end of the capacitor C24, and the ground voltage GND is applied to the second end of the capacitor C24. Thus, the capacitor C24 is charged to the voltage (−2×Vin), and the voltage (−2×Vin) charged across the capacitor C24 is outputted as the output voltage Vout2. That is, in the polarity-reversing double step-up charge pump, the input voltage Vin is stepped up to double its value, and further its polarity is reversed to generate the output voltage Vout2 (=−2×Vin).

As described above, in the power supply circuit of this embodiment, the first end of the charge accumulation capacitor C22 in a first stage of the charge pump is connected to a terminal (the terminal T22) from which a switched voltage Vsw is outputted, and output switches (the transistors M21 and M22) with which the DC/DC converter is formed are also used as part of the charge transfer switches with which the charge pump is formed (see a broken line in FIG. 2). ON/OFF control of the other charge transfer switches with which the charge pump is formed is also performed according to duty ratios of the output switches with which the DC/DC converter is formed. With this configuration, it is possible to provide a power supply circuit having both a DC/DC converter and a charge pump without an unnecessary increase in number of transistors and external terminals of the power supply IC 20.

Furthermore, it is needless to say that the power supply circuit of the second embodiment provides the same advantages as the power supply circuit of the first embodiment does, namely, increased current capability of the charge pump, reduced noise on the DC/DC converter side, and elimination of need of a clock signal for controlling the charging and discharging operations.

The power supply circuit of this embodiment is preferable as power supply means for a camera module or a mobile device using a CCD sensor.

Figure 3:
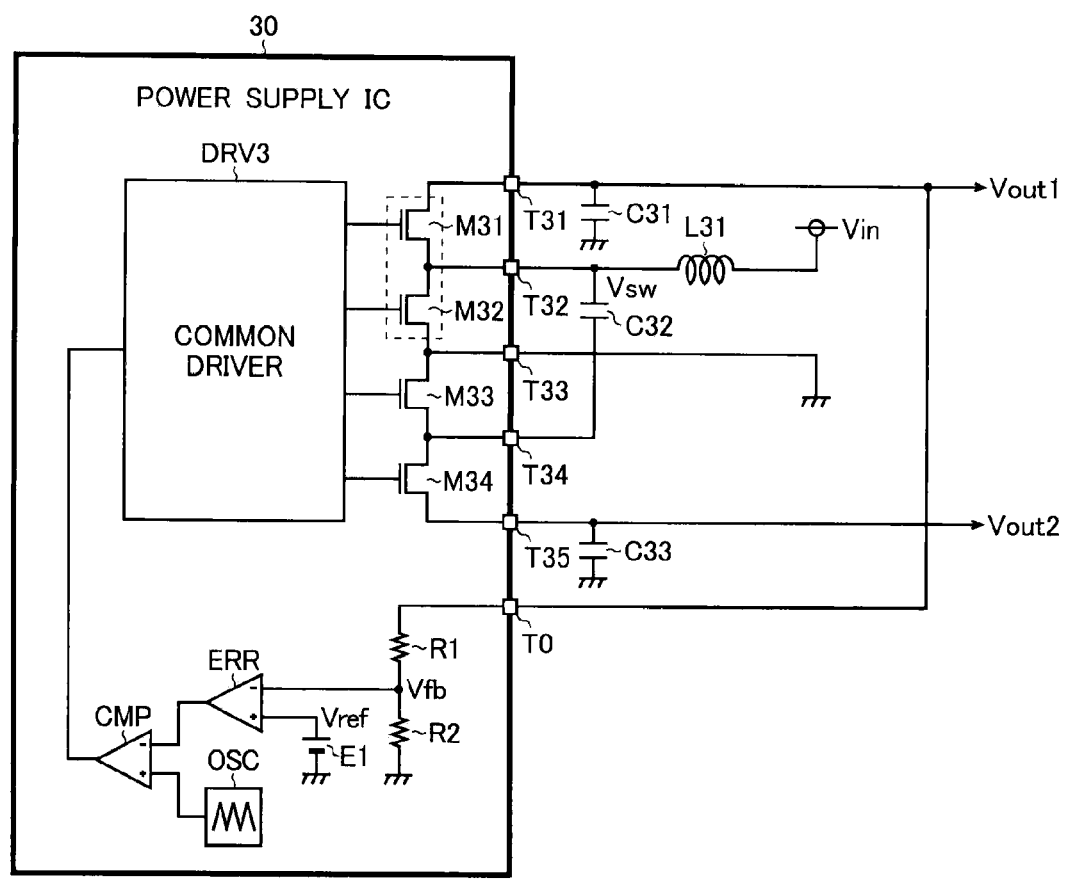
FIG. 3 is a circuit block diagram showing a third embodiment of a power supply circuit according to the present invention.

Next, a description will be given of a third embodiment of the power supply circuit according to the present invention. FIG. 3 is a circuit block diagram showing the third embodiment of the power supply circuit according to the present invention. As shown in FIG. 3, the power supply circuit of this embodiment has a power supply IC 30, an inductor L31, and capacitors C31 to C33. The power supply IC 30 has field-effect transistors M31 to M34, a common driver DRV3, resistors R1 and R2, a DC voltage supply E1, an error amplifier ERR, an oscillation circuit OSC, and a comparator CMP integrated therein, and further has a terminal To and terminals T31 to T35 as means for establishing external electric connection.

In the power supply IC 30, the transistor M31 is connected between the terminals T31 and T32. The transistor M32 is connected between the terminals T32 and T33. The transistor M33 is connected between the terminals T33 and T34. The transistor M34 is connected between the terminals T34 and T35. Gates of the transistors M31 to M34 are each connected to the common driver DRV3. The connection relationship among the resistors R1 and R2, the error amplifier ERR, the DC voltage supply E1, the oscillation circuit OSC, the comparator CMP, and the common driver DRV2 is similar to that of the first or second embodiment described above, and thus no overlapping description thereof will be repeated.

Outside the power supply IC 30, the terminal T31 is connected to a terminal from which an output voltage Vout1 is outputted, and is also connected to a first end of the capacitor C31. A second end of the capacitor C31 is connected to a ground terminal. The terminal T32 is connected to a first end of the inductor L31 and to a first end of the capacitor C32. A second end of the inductor L31 is connected to a terminal to which an input voltage Vin is inputted. The terminal T33 is connected to a ground terminal. The terminal T34 is connected to a second end of the capacitor C32. The terminal T35 is connected to a terminal from which an output voltage Vout2 is outputted, and is also connected to a first end of the capacitor C33. A second end of the capacitor C33 is connected to a ground terminal. The terminal To is connected to the terminal from which the output voltage Vout1 is outputted.

That is, in the power supply circuit of the third embodiment, a step-up DC/DC converter (a switching regulator) is formed by using the transistors M31 and M32, the inductor L31, and the capacitor C31, and a polarity-reversing charge pump is formed by using the transistors M31 to M34 and the capacitors C32 and C33. Also, in the power supply circuit of the third embodiment, as in the first or second embodiment described above, a feedback control portion is formed by using the resistors R1 and R2, the error amplifier ERR, the DC voltage supply E1, the oscillation circuit OSC, the comparator CMP, and the common driver DRV3.

In the power supply circuit configured as described above, the step-up DC/DC converter steps up the input voltage Vin to generate the output voltage Vout1 by turning on and off the output switches (the transistor M32 as an output device and the transistor M31 as a synchronous rectification device) to generate the pulsing switched voltage Vsw (having a rectangular waveform) at the terminal T32 and then rectifying and smoothing the switched voltage Vsw. The operation of the feedback control portion is similar to that of the first or second embodiment described above, and thus overlapping description thereof will be omitted.

On the other hand, in the power supply circuit configured as described above, the polarity-reversing charge pump reverses the polarity of the input voltage Vin to generate the output voltage Vout2 (=−Vout1) by turning on/off the charge transfer switches (transistors M31 to M34) to repeat charging and discharging of the charge accumulation capacitor C32.

A detailed description will be given of a specific operation of the charge pump. The common driver DRV3 turns on the transistors M31 and turns off the transistor M32 to make the switched voltage Vsw high level, and in synchronism with this, the common driver DRV3 turns on the transistor M33 and turns off the transistor M34. At this time, a high level electric potential (the output voltage Vout1) of the switched voltage Vsw is applied to first end (on the terminal T32 side) of the capacitor C32, and the ground voltage GND is applied to the second end (on the terminal T34 side) of the capacitor C32. As a result, the capacitor C32 is charged to the output voltage Vout1.

The common driver DRV3 turns off the transistor M31 and turns on the transistor M32 to make the switch voltage Vsw low level, and in synchronism with this, the common drive DRV3 turns off the transistor M33 and turns on the transistor M34. At this time, a voltage applied to first end (on the terminal T32 side) of the capacitor C32 is reduced from the high level potential (the output voltage Vout1) to a low level potential (the ground voltage GND) of the switched voltage Vsw. Here, since an electric potential difference equal to the output voltage Vout1 is given across the capacitor C32 by the above-mentioned charging, along with the voltage applied to the first end (on the terminal T32 side) of the capacitor C32 being reduced to the ground voltage GND, a voltage extracted from the second end side (the terminal T34 side) of the capacitor C32 is also reduced to (−Vout1) (=(the voltage GND at the first end of the capacitor C32)−(the voltage Vout1 across the capacitor C12)).

Furthermore, at this time, since the transistor M33 is turned off and the transistor M34 is turned on, the voltage (−Vout1) extracted from the second end (on the terminal T34 side) of the capacitor C32 is applied to the first end of the capacitor C33. Moreover, the ground voltage GND is applied to the second end of the capacitor C33. Thus, the capacitor C33 is charged to (−Vout1), and the voltage (−Vout1) across the capacitor C33 is outputted as the output voltage Vout2. That is, the polarity-reversing charge pump reverses the polarity of the output voltage Vout1 to generate the output voltage Vout2 (=−Vout1).

As described above, in the power supply circuit of this embodiment, the first end of the charge accumulation capacitor C32 with which the charge pump is formed is connected to a terminal (the terminal T32) from which the switched voltage Vsw is outputted, and the output switches (the transistors M31 and M32) with which the DC/DC converter is formed are also used as part of the charge transfer switches with which the charge pump is formed (see a broken line in FIG. 3).

ON/OFF control of the other charge transfer switches with which the charge pump is formed is performed according to duty ratios of the output switches with which the DC/DC converter is formed. With this configuration, it is possible to provide a power supply circuit having both a DC/DC converter and a charge pump without an unnecessary increase in number of transistors and external terminals of the power supply IC 30.

Furthermore, it is needless to say that the power supply circuit of the third embodiment provides the same advantages as the power supply circuits of the first and second embodiments do, namely, increased current capability of the charge pump, reduced noise on the DC/DC converter side, and elimination of a clock signal for controlling the charging and discharging operations.

The power supply circuit of this embodiment is preferable as power supply means for, for example, supplying a liquid crystal display with both a positive voltage and a negative voltage.

It should be understood that, other than the embodiments described above, many modifications and variations are possible within the spirit of the present invention.

For example, although the above descriptions of the embodiments deal with, as an example, a step-up or step-down DC/DC converter, this is not meant to limit the configuration of the present invention, and a polarity-reversing DC/DC converter may be used. Furthermore, although the above descriptions of the embodiments deal with, as examples of a charge pump, double step-up, reverse double step-up, and polarity reversing charge pumps, this is not meant to limit the configuration of the present invention, and for example, the charge pump may have a multi-stage configuration in order to achieve a higher step-up ratio.

As for the industrial applicability of the present invention, the present invention provides a technology applicable to power supply circuits that generate a desired output voltage from an input voltage.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A power supply circuit, comprising:
   a DC/DC converter that steps down an input voltage or reverses a polarity of the input voltage to generate a first output voltage by rectifying and smoothing a pulsing switched voltage generated by turning on and off an output switch; and
   a charge pump that steps up the input voltage or reverses the polarity of the input voltage to generate a second output voltage by turning on and off a charge transfer switch to repeat charging and discharging of a charge accumulation capacitor,
   wherein
   a first end of the charge accumulation capacitor is connected to a terminal from which the switched voltage is outputted, and the output switch is also used as part of the charge transfer switch.

2. The power supply circuit according to claim 1, further comprising:
   a feedback control portion performing ON/OFF control of the output switch and the charge transfer switch such that a feedback voltage commensurate with the first output voltage is equal to a predetermined reference voltage.

3. The power supply circuit according to claim 2, wherein
the feedback control portion includes:
- a feedback voltage generation circuit dividing the first output voltage to generate the feedback voltage;
- a reference voltage generation circuit generating the reference voltage;
- an error amplifier amplifying a difference between the feedback voltage and the reference voltage to generate an error voltage;
- an oscillation circuit generating a slope voltage having a triangular waveform or a sawtooth waveform;
- a comparator comparing the error voltage with the slope voltage to generate a PWM signal; and
- a common driver generating a drive signal for the output switch and a drive signal for the charge transfer switch based on the PWM signal.

4. A semiconductor device used in the power supply circuit according to claim 2, wherein
the semiconductor device has integrated therein the output switch, the charge transfer switch, and the feedback control portion.

5. A semiconductor device used in the power supply circuit according to claim 3, wherein
the semiconductor device has integrated therein the output switch, the charge transfer switch, and the feedback control portion.

6. A power supply circuit, comprising:
- a DC/DC converter that steps up an input voltage to generate a first output voltage by rectifying and smoothing a pulsing switched voltage generated by turning on and off an output switch; and
- a charge pump that reverses a polarity of the first output voltage to generate a second output voltage by turning on and off a charge transfer switch to repeat charging and discharging of a charge accumulation capacitor, wherein
a first end of the charge accumulation capacitor is connected to a terminal from which the switched voltage is outputted, and the output switch is also used as part of the charge transfer switch.

7. The power supply circuit according to claim 6, further comprising:
a feedback control portion performing ON/OFF control of the output switch and the charge transfer switch such that a feedback voltage commensurate with the first output voltage is equal to a predetermined reference voltage.

8. The power supply circuit according to claim 7, wherein
the feedback control portion includes:
- a feedback voltage generation circuit dividing the first output voltage to generate the feedback voltage;
- a reference voltage generation circuit generating the reference voltage;
- an error amplifier amplifying a difference between the feedback voltage and the reference voltage to generate an error voltage;
- an oscillation circuit generating a slope voltage having a triangular waveform or a sawtooth waveform;
- a comparator comparing the error voltage with the slope voltage to generate a PWM signal; and
- a common driver generating a drive signal for the output switch and a drive signal for the charge transfer switch based on the PWM signal.

9. A semiconductor device used in the power supply circuit according to claim 7, wherein
the semiconductor device has integrated therein the output switch, the charge transfer switch, and the feedback control portion.

10. A semiconductor device used in the power supply circuit according to claim 8, wherein
the semiconductor device has integrated therein the output switch, the charge transfer switch, and the feedback control portion.

* * * * *